May 16, 1939.　　　　D. B. GISH　　　　2,158,538
HOSE
Filed July 14, 1938
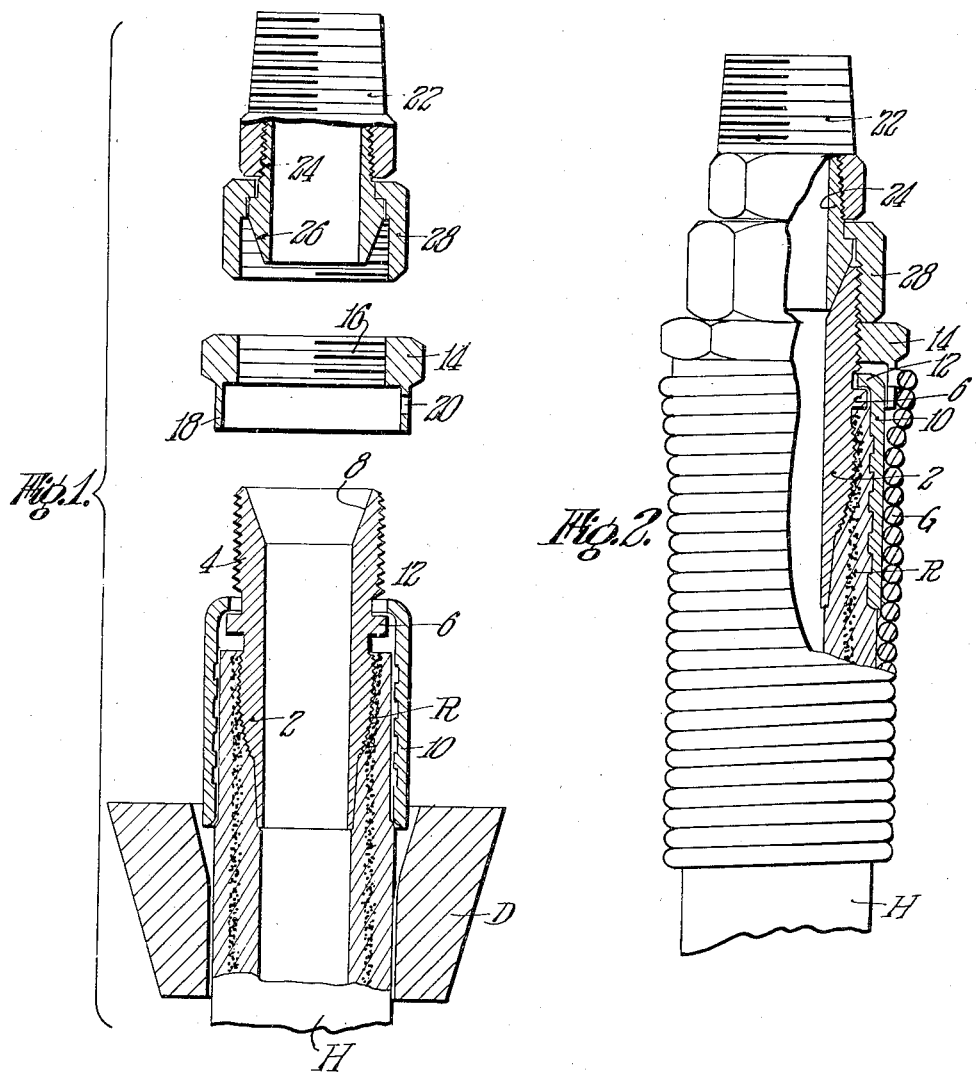
INVENTOR.
Daniel B. Gish.
BY Walter C. Ross
ATTORNEY.

Patented May 16, 1939

2,158,538

UNITED STATES PATENT OFFICE 2,158,538

HOSE

Daniel B. Gish, West Springfield, Mass.

Application July 14, 1938, Serial No. 219,182

2 Claims. (Cl. 285—82)

This invention relates to improvements in coupling and is directed more particularly to a combined hose and coupling construction.

It is one of the principal objects of the invention to provide a hose and coupling construction having a part for threadedly engaging a pipe or the like and the arrangement is such that economy and ease in manufacture are attained.

As special features, a novel tubular member is compressed around the hose so as to cause the same to grip the tail-piece and there is means to prevent relative axial movement of the tubular member and tail-piece.

Still another object of the invention is the provision of a combined hose and coupling construction where there is a coiled guard member over the hose and means is provided for holding the same to the assembly.

Various other objects and advantages of the invention will become more apparent after a reading of the following description and reference will be had to the accompanying drawing wherein:

Fig. 1 is a sectional elevational view of several parts of the invention in disassembled relation; and Fig. 2 is an elevational view of the assembled construction with parts in section.

Referring now to the drawing in detail the invention will be more fully described.

A hose is indicated by H and it preferably has its upper end interiorly ground so as to expose reinforcing braid R. A hollow tail piece member has a lower portion 2 inserted therein and in engagement with the interior of the hose as shown.

The upper part 4 of the insert or tail piece member is provided with an exterior straight thread as shown while intermediate the upper and lower parts is a projecting annular flange 6. The upper part of the bore of the tail piece is formed to present a conical seat 8 for a purpose which will presently appear.

A tubular shell member 10 surrounds the hose and it may have an irregular interior surface as shown. In any event the upper end of shell 10 is turned inwardly to form a part 12 and the shell is compressed around the hose, as by a die D, so that the said irregular surface impinges the outside of the hose and the part 12 is compressed around the tail piece between the parts 4 and 6 thereof.

A lock nut 14 having interior threads 16 is disposed around the threaded part 6 of the tail piece. The nut 14 may or may not have an annular skirt 18, as shown, but when provided it is formed to surround the upper end portion of shell 10 and it preferably has an opening 20 therein for a purpose to be described.

An externally threaded coupling part 22 for connecting to a pipe or the like is provided and it has internal threads in the lower end of its bore for engaging a threaded upper part of a bored member 24 as shown. The lower end of the latter member is tapered to present a conical seat 26.

An interiorly threaded coupling member 28 has a flange 30 surrounding a reduced portion of the member 24 and the construction is such that the part 28 is rotatable, but not movable axially, relative to the part 24.

When the various parts are assembled, the upper end of the tail piece is threadedly received within the bore of member 28 with the conical seats 8 and 26 in abutment. Then the lock nut 14 is tightened up so as to lock against the part 28, so as to prevent loosening of the threads which cooperate to keep the faces or seats 8 and 26 in tight engagement.

If desired, there may be a coiled protective or guard member 6 surrounding the shell 10 and this may extend therebelow so as to surround the part of the hose immediately adjacent the lower end of the shell. Where the nut having the apertured skirt 18 is employed, an end part of the coil G extends into the opening 20 which serves to lock the parts securely in place, as shown in Fig. 2.

I have found that very excellent results are attained when the angle of seats 26 and 8 is approximately twenty degrees, as contrasted with the standard practise of thirty degrees or more and where the threads on part 4 are straight, as contrasted with the usual taper. That is to say, this combination of features cooperates to produce the desired locking wedging effect with a minimum of effort.

In connection with prior art practise where tapered threads and greater angles are employed, it is necessary, when tightening up the parts, to place a wrench on the hose coupling and one on the union nut 28 in order to prevent the hose coupling and hose becoming twisted when the parts are tightened up. With the construction of this invention it is only necessary to apply a wrench to nut 28 which, of course, saves time and effort.

Furthermore, the construction of this invention has the added advantage of being more tightly sealed, even with the use of one wrench, than is the case where tapered threads and greater angles are used.

It should be stated also that with the straight-thread and small-angles features of this invention which were just mentioned, I find that the lock nut may be omitted. That is to say, the desired tight seal is possible to attain without the lock nut which is merely an extra precaution in cases where heavy vibrations are encountered, such as in connection with airplanes.

When the lock nut is not a part of the assembly and the guard member G is employed, it is possible to employ a member 28 having a skirt similar to that numbered 18 having an opening 20. Then the end of the guard may be attached to the skirt on the union 28 in substantially the same manner as to the lock nut, as shown.

While I have described the invention in great detail and with respect to the present preferred form thereof, it is not desired to be limited thereto since many changes and modifications may be made therein without departing from the spirit and scope of the invention. What it is desired to claim and secure by Letters Patent of the United States is:

1. In a combined hose and coupling construction having a tail-piece with upper threaded part for connecting to a coupling member and a lower part extending into the end of a hose and a sleeve compressed around the hose securing it to the lower part of the tail-piece and around an intermediate part of the tail-piece holding it and the sleeve against relative axial movement, a nut on said upper threaded part of the tail-piece adapted to abut against the said coupling member, said nut having an annular skirt extending downwardly around the outside of the upper part of said sleeve, and a coiled protecting member surrounding the upper part at least of said sleeve, said protecting member having its upper end portion secured to said skirt and its lower end portion extending below the sleeve and around a part of the hose.

2. In a combined hose and coupling construction having a tail-piece with upper threaded part for connecting to a coupling member and a lower part extending into the end of a hose and a sleeve compressed around the hose securing it to the lower part of the tail-piece and around an intermediate part of the tail-piece holding it and the sleeve against relative axial movement, a nut on said upper threaded part of the tail-piece adapted to abut against the said coupling member, said nut having an annular skirt extending downwardly around the outside of the upper part of said sleeve and said skirt being provided with an opening therein, and a coiled protecting member surrounding the upper part at least of said sleeve, said protecting member having an upper end part extending into said opening in said skirt and its lower end portion extending below the sleeve and around a part of the hose.

DANIEL B. GISH.